(12) United States Patent
White et al.

(10) Patent No.: US 7,139,839 B2
(45) Date of Patent: Nov. 21, 2006

(54) METHOD AND APPARATUS FOR ASSIGNING A NETWORK NODE ADDRESS

(75) Inventors: William A. White, Carlisle, MA (US); Richard Chisholm, Swampscott, MA (US); Paul G. Wolejko, Newburyport, MA (US); Lothar Ullrich, Hessen (DE)

(73) Assignee: Schneider Automation Inc., North Andover, MA (US)

( * ) Notice: Subject to any disclaimer, the term of this patent is extended or adjusted under 35 U.S.C. 154(b) by 720 days.

(21) Appl. No.: 10/004,311

(22) Filed: Nov. 26, 2001

(65) Prior Publication Data

US 2003/0101282 A1    May 29, 2003

(51) Int. Cl.
*G06F 15/16* (2006.01)

(52) U.S. Cl. .................. 709/245; 370/254; 710/9; 709/221

(58) Field of Classification Search ............. 709/245, 709/220–228; 710/7–10
See application file for complete search history.

(56) References Cited

U.S. PATENT DOCUMENTS

| | | | | |
|---|---|---|---|---|
| 5,293,634 A * | 3/1994 | Takahashi et al. | ......... | 709/245 |
| 5,404,460 A * | 4/1995 | Thomsen et al. | ............ | 710/9 |
| 5,675,830 A * | 10/1997 | Satula | ............. | 710/9 |
| 5,708,831 A * | 1/1998 | Schon | ............ | 709/245 |
| 5,768,277 A * | 6/1998 | Ohno et al. | ............ | 370/457 |
| 5,974,475 A * | 10/1999 | Day et al. | ............ | 710/9 |
| 5,980,078 A * | 11/1999 | Krivoshein et al. | ............ | 700/1 |
| 6,055,596 A * | 4/2000 | Cepulis | ............ | 710/104 |
| 6,167,464 A | 12/2000 | Kretschmann | | |
| 6,175,932 B1 * | 1/2001 | Foote et al. | ............ | 714/9 |
| 6,216,172 B1 * | 4/2001 | Kolblin et al. | ............ | 709/253 |
| 6,415,343 B1 * | 7/2002 | Fensore et al. | ............ | 710/104 |
| 6,427,167 B1 * | 7/2002 | Siedel | ............ | 709/222 |
| 6,487,623 B1 * | 11/2002 | Emerson et al. | ............ | 710/302 |
| 6,654,382 B1 * | 11/2003 | Bare et al. | ............ | 370/463 |
| 6,700,877 B1 * | 3/2004 | Lorenz et al. | ............ | 370/254 |
| 6,721,799 B1 * | 4/2004 | Slivkoff | ............ | 709/236 |
| 7,032,029 B1 * | 4/2006 | Tanzman et al. | ............ | 709/245 |
| 2001/0050543 A1 * | 12/2001 | Zeilinger | ............ | 320/137 |
| 2002/0002644 A1 * | 1/2002 | Vowe | ............ | 710/100 |

FOREIGN PATENT DOCUMENTS

| | | |
|---|---|---|
| DE | 19621272 A1 | 11/1997 |
| DE | 19733906 A1 | 2/1999 |

OTHER PUBLICATIONS

CiA Draft Standard CAN Physical Layer for Industrial Applications, Apr. 20, 1994.*
CAN Specification Version 2.0.*
Farsi, Mohammed, Carvalho, A. , and Barbosa, M. ,"CANopen I/O Module: Simple and Efficient System Integration", IEEE 1998.*
Preston, David J., Internet Protocols Migrate to Silicon for Networking Devices, *Electronic Design*, vol. 45, No. 8, Apr. 14, 1997, pp. 87-90.

(Continued)

*Primary Examiner*—William C. Vaughn, Jr.
*Assistant Examiner*—Greg Bengzon

(57) ABSTRACT

A method and apparatus for assigning a permanent identifier to a client node initially having a default identifier and being operably connected to a network. A server determines a location of the client node and assigns the permanent identifier to the client node in response to the location of the client node on the network.

17 Claims, 6 Drawing Sheets

OTHER PUBLICATIONS

Klesper, Tilo, "Der Internet-Zugriff Aufs Lon Weltweiter Zugriff Auf Die Sensorik Und Aktorik Von Automatisierungs-Projekten", *Elecktronick*, vol. 47, No. 8, Apr. 14, 1998, pp. 60, 62, 64, 66.

Communication from the European Patent Office including International Search Report from WO 03/047215, mailed Jul. 4, 2003.

Kubota, Y, et al., NTT Human Interface Laboratories, "Proposal of the Robot System With Information Sending Mechanism," Presented at the 14th Annual Conference of the Robotics Society of Japan, Nov. 1-3, 1996, pp. 341-342. (In Japanese w/English translation included).

Picon, Gerard, Schneider Automation, "Java and Programmable Automation Controllers," *CiMax: Edition Terrain*, No. 13—May/Jun. 1997 (in French w/ English translation included).

Brugger, Peter, "Web Technology in Embedded Computing," *Industrial Computer 97—Special Edition;* Sep. 3, 1997 (in German w/ English translation included).

Williams, Tom, et al., "Java Goes to Work Controlling Networked Embedded Systems," *Computer Design*, Aug. 1996, pp. 36.

Fu, K.S., et al., *Robotics: Control, Sensing, Vision and Intelligence,* Chapter Five: Control of Robot Manipulators; Sections 5.1-5.3.1.

*Automation Strategies,* by Automation Research Corporation, Feb. 1998, pp. 1-32.

Lecuivre, J., et al., *A framework for validating distributed real time applications by performance evaluation of communication profiles,* Factory Communication Systems, 1995, WFCS '95, Proceedings, 1995 IEEE International Workshop on Leysin, Switzerland Oct. 4-6, 1995, New York, NY, pp. 37-46.

*Modicon Modbus Protocol Reference Guide,* Modicon, Inc., Jun. 1996, pp. 1-12.

Swales, Andy, *Topology Considerations for Modbus/Therenet Automation Networks,* Law Controls, Inc., Jan. 25, 2000.

Beaupre, Jacques, et al., *Advanced Monitoring Technologies for Substations,* IEEE, Oct. 9, 2000, pp. 287-292.

Mostafa, W., et al., *A Taxonomy of Multicast Protocols for Internet Applications,* Computer Communications, Elsevier Science Publishers BV, Amsterdam, NL, vol. 20, No. 16, 1998, pp. 1448-1457.

* cited by examiner

1. $TEMP_toggle is set equal to $MAXNODES
2. $TEMP_toggle transistions, from $INACTIVE to $ACTIVE, are exhibited on its address output pin. The pin is left $ACTIVE.
3. The message $GETCOUNT($DEFAULT) message is sent.
4. If the message succeeded in reaching the node:
    4.1. The value found in the reply to the message is stored in $TEMP_count. {Since the output pin of the server node is left $ACTIVE, the client node immediately adjacent to it has $NODEID equal to $UNCONFIGURED, the adjacent node responds as node $DEFAULT}
    4.2. $TEMP_node is set to ($TEMP_count +1)
    4.3. The message $SETADDRESS($DEFAULT, $TEMP_node +1) is sent.
    4.4. The server node's output address pin is set $INACTIVE.

{At this point, the node immediately adjacent to the server node has been given its address}

4.5. $TEMP_toggle is set to ($MAXNODES-$TEMP_node)
    4.6. The server sends the message $TOGGLE($TEMP_node, $TEMP_toggle)
    4.7. The server sends the message $GETCOUNT($DEFAULT).
    4.8. If the message succeeded in reaching the node:
        4.8.1. The resulting value is stored in $TEMP_count. {Since the output pin of the node $TEMP_node is $ACTIVE, the client node immediately adjacent to it has $NODEID equal to $UNCONFIGURED, the adjacent client node responds as node $DEFAULT}
        4.8.2. $TEMP_newnode is set to (TEMP_node + $TEMP_toggle - $TEMP_count +1).
        4.8.3. The server sends the message $SETADDRESS($DEFAULT,$TEMP_newnode)
        4.8.4. The server sends the message $SETADDRESSPIN($TEMP_node, $INACTIVE)
        4.8.5. $TEMP_node is set equal to $TEMP_newnode
        4.8.6. Go to step 4.5
5. Finished; all adjacent nodes have had their addresses assigned

*Fig. 2*

1. $TEMP_node is set to 0.
2. If $TEMP_node is equal to $MAXNODES, then exit {no unconfigured node found}.
3. The server sends the message $GETCOUNT($TEMP_node+1)
4. If the message succeeded in reaching the node:
    4.1. $TEMP_node=$TEMP_node+1.
    4.2. Return to step 2

(At this point, the $TEMP_node is the address of an existing node with no immediate} successor)

5. $TEMP_toggle is set to ($MAXNODES-$TEMP_node)
6. If $TEMP_node is equal to zero
    6.1. The server toggles causes $TEMP_toggle transitions from $INACTIVE to $ACTIVE to be exhibited on its output adress pin, and the pin is left $ACTIVE
    6.2. Else {the case in which $TEMP_node not equal to zero}
        6.2.1 The server sends the message $TOGGLE($TEMP_node, $TEMP_toggle)
7 The server sends the message $GETCOUNT($DEFAULT).
8. If the message succeeded in reaching the node:
    8.1. The resulting value is stored in $TEMP_count. {Since the output pin of the node $TEMP_node is $ACTIVE, the client node immediately adjacent to it responds as node $DEFAULT}
    8.2. The server sends the message
            $SETADDRESS$DEFAULT,$TEMP_node + $TEMP_toggle - $TEMP_count +1).
    8.3. If $TEMP_node is equal to 0
        8.3.1. The server sets its output address pin to $INACTIVE
        8.3.2. Else {the case in which $TEMP_node is not equal to zero}
            8.3.2.1. The server sends the message
                    $SET ADDRESSPIN($TEMP_node, $INACTIVE)
Else (the message did not reach the node, meaning the node that made the broadcast is not adjacent to the node whose $NODEID is $TEMP_node)
    9.1. If $TEMP_node equal to $TEMP_node+1
    9.2. If $TEMP_node is greater than $MAXNODES, then exit {no unconfigured note found}
    9.3. The server sends the message $GETCOUNT($TEMP_node)
    9.4. If the message suceeded in reaching he node:
        9.4.1. Return to step 2
        9.4.2. Else {no node found}
            9.4.2.1. Got to step 9.1
10. Finished

*Fig. 3*

Upon receipt of the address request from the client node 12, the server 14 performs the following steps:
1. $TEMP_node is set to $OLDEST.
2. If $TEMP_node is is equal to $UNCONFIGURED, then exit
   {no unconfigured node found}
3. The server sends the message $GETCOUNT($TEMP_node)
4. If the message succeeded in reaching the node:
   4.1 $TEMP_node = $ACT[$TEMP_node].$NEWER
   4.2 Return to step 2
{At this point, the $TEMP_node is the address of a node which is not responding and which has not been heard from for the longest time}
5. If $TEMP_node is equal to $UNCONFIGURED, then exit {no unconfigured node found}.
6. $TEMP_node = $TEMP_node - 1
7. If $TEMP_node is greater than 0
   7.1 The server sends the message $GETCOUNT($TEMP_node)
   7.2 If the message succeeded in reaching the node:
   7.3 Return to step 6
{At this point, the $TEMP_node is the address of an existing node with no immediate successor}

8. $TEMP_toggle is set to ($MAXNODES - $TEMP_node)
9. If $TEMP_node is equal to zero
   9.1 The server toggles causes $TEMP_toggle transitions from $INACTIVE to $ACTIVE to be exhibited on its output address pin, and the pin is left $ACTIVE
   9.2 Else {the case in which $TEMP_node not equal to zero}
      9.2.1. The server sends the message $TOGGLE($TEMP_node, $TEMP_toggle)
10. The server sends the message $GETCOUNT($DEFAULT)
11. If the message succeeded in reaching the node:
    11.1 The resulting value is stored in $TEMP_count. {Since the output pin of the node $TEMP_node is $ACTIVE, the client node immediately adjacent to it responds as node $DEFAULT}
    11.2 The server sends the message
                $SETADDRESS($DEFAULT, $TEMP_node
                 +$TEMP_toggle-$TEMP_count+1)
    11.3 If $TEMP_node is equal to 0
       11.3.1. The server sets its output address pin to $INACTIVE
       11.3.2. Else {the case in which $TEMP_node is not equal to zero}
          11.3.2.1 The server sends the message $SETADDRESSPIN($TEMP_node, $INACTIVE)
12. Else {message did not reach the node, meaning the node that made the broadcast is not adjacent to the node whose $NODEID is $TEMP_node}
    12.1. Set $TEMP_node equal to $TEMP_node+1
    12.2. If $TEMP_node is greater than $MAXNODES, then exit {no unconfigured node found)
    12.3. The server sends the message $GETCOUNT($TEMP_node)
    12.4. If the message succeeded in reach the node:
       12.4.1. Return to step 2
       12.4.2. Else {no node found}
          12.4.2.1. Got to step 9.1
13. Finished.

*Fig. 4*

Updating the activity table, $ACT.

1. Store the node id of the sender/receiver in $TEMP_node
2. $TEMP_older=$ACT[$TEMP_node].$OLDER
3. $TEMP_newer=$ACT[$TEMP_node].$NEWER
4. If $TEMP_older is equal to $UNCONFIGURED
   4.1 Then set $OLDEST equal to $TEMP_newer
   4.2 Else $ACT[$TEMP_older].$NEWER=$TEMP_newer
1. If $TEMP_newer is not equal to $UNCONFIGURED.
   5.1 Then set $ACT[$TEMP_newer].$OLDER=$TEMP_older
1. $ACT[$TEMP_node].$NEWER=$UNCONFIGURED.
2. $ACT[$TEMP_node].$OLDER=$NEWEST
3. $NEWEST = $TEMP_node

*Fig. 5*

Mapping of CANOpen constructs for Automatic Addressing

| Temporary variables | Each node has storage available for the temporary variables required to support the addressing scheme. |
|---|---|
| $TIME | Each node has a timer, implemented as a memory location which is incremented each time a periodic interrupt occurs. The granularity of this timer is not critical to the addressing scheme, but the time-related tuning parameters will be some multiple of the basic timer increment. |
| $DEFAULT | The default address to be taken by a node shall be 127. |
| $UNCONFIGURED | The value stored in a node which has no address configured shall be 0. |
| $ACTIVE | The value corresponding to the active state of an addressing pin shall be any voltage less than -4.5 volts. |
| $INACTIVE | The value corresponding to the inactive state of an addressing pin shall be any voltage greater than -0.5 volts. |
| $ACTIVETIME | The duration of the active portion of a cycle on the address line shall be two clock ticks. |
| $INACTIVETIME | The duration of the inactive portion of a cycle on the address line shall be two clock ticks. |
| $TIMEOUT | The timeout period after a series of state changes on an address pin shall be four clock ticks. |
| $ADDRESSMSGTIMEMIN | The server must complete a cussessful addressing sequence within 32 + 2*N clock ticks of the $TOGGLE message completion, where N is the number of transitions specific in the $TOGGLE message. |
| $ADDRESSMSGTIMEMAX | The server must not begin another addressing sequence until 64 + 2*N clock ticks have passed since a previous $TOGGLE message was sent. |
| $SETADDRESS(X,N) | This corresponds to CANOpen LSS service |
| $SETADDRESSPIN(X,Y) | This is implemented by wriing to a node OD (using a CANOpen SDO) at a determined index, subindex 1. When this OD entry is written with 0, the address pin is set to $INACTIVE, otherwise it is set $ACTIVE. |
| $TOGGLE(X,N) | This is implemented by writing to a node (using a CANOpen SDO) at a predetermined index, subindex 2. When this entry is written, the node should begin producing transitions on its output address pin. |
| $GETCOUNT(X) | This corresponds to reading from a node (using a CANOpen SDO) at a determined index, subindex 3. When a node detects an $ACTIVE-going transition on its input address pin, it should record it in this entry. |
| $NODEID | This value is stored in each node. |
| $COUNT | This is a storage location in each node, at determined, subindex 3. |
| $TIMESTAMP | This is the current value of the clock in each node. |
| $ADDRESSREQUEST | This is implemented using CANOpen LSS layer service. |

*Fig. 6*

METHOD AND APPARATUS FOR ASSIGNING A NETWORK NODE ADDRESS

The present invention is generally related to communication networks. More specifically, the present invention is related to assigning a network address to a module node in response to the location of the module within the network.

BACKGROUND OF THE INVENTION

Communication network systems are comprised of a plurality of network module nodes wherein the modules interact to accomplish a task. Proper communication within the system requires each network node, i.e., device module, to be distinguished by a unique identifier. Typically, the distinguishing identifier is a network address, e.g., Media Access Control (MAC) address, Internet Protocol (IP) address, etc.

The network identifier is manually or automatically assigned to the network module. Manual assignment requires network personnel to associate the node identifier with the network code. Automatic assignment of node identifiers can be accomplished in various ways. A technique used with BOOTP-type protocols incorporates a resource table for associating serial numbers with node identifiers. The node, i.e., client, broadcasts an address request signal containing its serial number and a server responds with a node identifier. In an Ethernet network, the node broadcasts its MAC address with an address request. An IP address is returned as the node identifier. Other similar protocols such as DHCP-type, incorporate a sequence of characters associated with the node, and an IP address will be returned in response to the address request.

Problems occur when a network node having an identifier, e.g., MAC address, is removed or replaced because the network operating code must be modified to reflect the network identifier and address of the replacing node This invention is directed to solving these and other problems.

SUMMARY OF THE INVENTION

The present invention is directed to a method of assigning a network address to an operably connected node in response to the physical location of the node within the network. More specifically, a server detects the location of a client node and assigns a network address to the client node dependent upon the location of the node within the network.

One embodiment of the present invention is a method for assigning a network identifier to a client module node in response to the location of the client node to a network adapter, i.e., server. The method comprises powering up the network system wherein a network server assigns network addresses to one or more client nodes within the network. Initially, each client node is assigned a default network address that is a "temporary" network address. An address request is broadcasted throughout the network. The network adapter locates the nearest operably connected client node having a default address and assigns a network identifier to the node.

A further aspect of the present invention includes reserving a network identifier for later use within the network system. The reserved network identifier is associated with a holding node wherein the functionality of the holding node includes performing the addressing functions of the network.

Yet another further aspect of the present invention comprises a method for optimally assigning a network identifier to a client node.

Other advantages and aspects of the present invention will become apparent upon reading the following description of the drawings and detailed description of the invention.

BRIEF DESCRIPTION OF THE DRAWINGS

FIG. 2 is an example of a program code executed within the network communication system for automatically assigning a network address to a client node during power-up of the network;

FIG. 3 is an example of a program code executed within the network communication system for automatically assigning a network address to a client node during "hot swap" of the network;

FIG. 4 is an example of a program code executed within the network communication system for optimizing the program shown in FIG. 3;

FIG. 5 is an example of a program code executed within the network communication system for updating an activity table, $ACT; and, FIG. 6 is a table of constructs utilized in one embodiment of the present invention, i.e., CANOpen, network.

DETAILED DESCRIPTION OF THE PREFERRED EMBODIMENT

Figure 1:
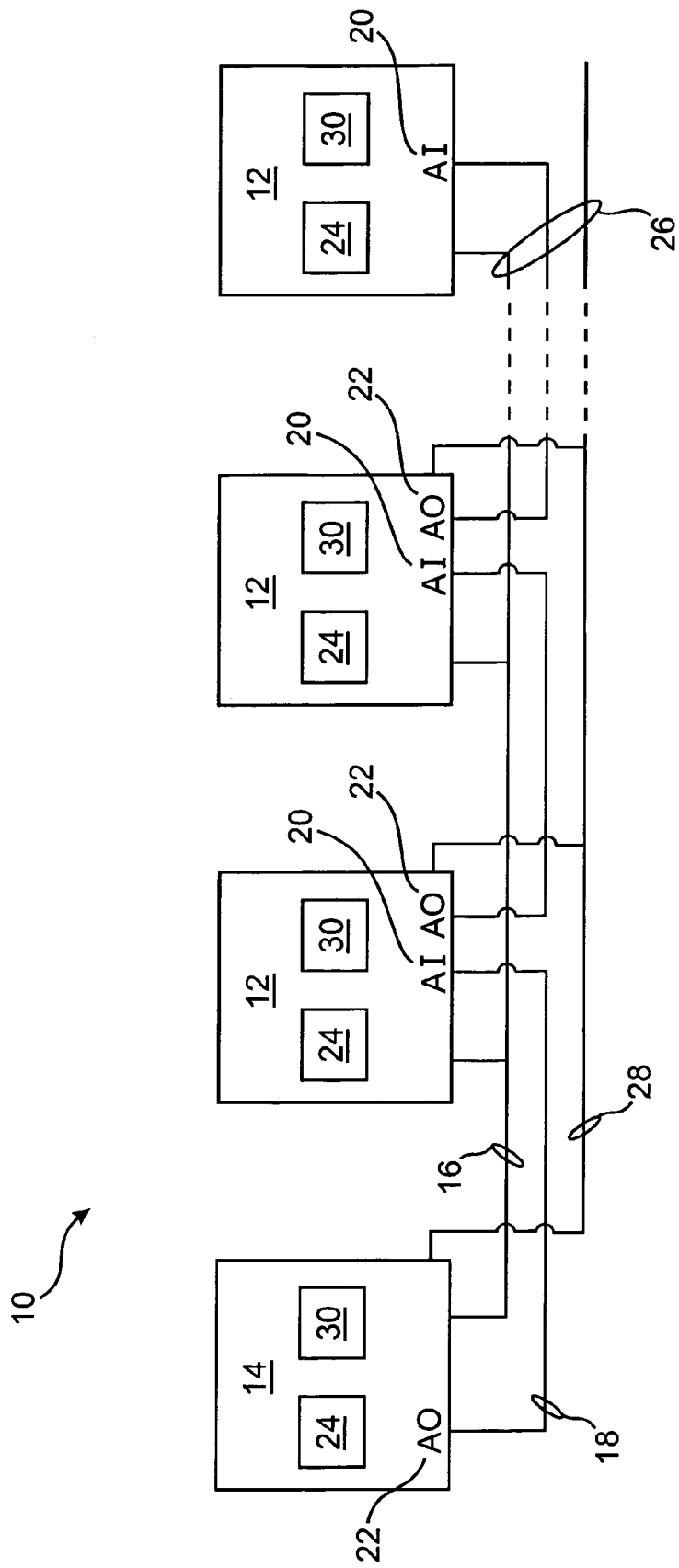
FIG. 1 is a block diagram drawing of a communication network system of the present invention.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 depicts an embodiment of the present invention directed to a communication network system 10, preferably CANOpen. At least one client node 12 is communicably connected to a network adaptor 14, e.g., server node, field bus connector. Each client node 12 is operably connected to the server node 14 via a communication bus 16, preferably CANOpen. Additionally, an address bus 18 connects the plurality of client nodes 12 with the server node 14. Each client node 12 is operably connected to the address bus 18 via an address input pin 20 and an address output pin 22. The address output 22 of the sever 14 is connected to the address input 20 of the nearest, adjacent, client node 12. The address output 22 of the adjacent client node 12 is connected to the address input 20 of the next adjacent client node 12. This serial-like connection continues with subsequent client nodes 12 until all of the client nodes of the network 10 are operably connected to the address bus 18. The address input 20 and address output 22 of each client node 12 resides in an active or inactive state and are operably connected to a processor 24 within the client node.

Preferably, the network 10 can be conveniently configured by inserting various client nodes 12, e.g., device modules, in a DIN rail 26. The DIN rail 26 operably connects the plurality of client nodes 12 with one or more server nodes 14. The DIN rail 26 comprises a power bus 28, the communication bus 16, and the address bus 18. Each client node 12 can be easily snapped into and out of the DIN rail 26.

The server node 14 manages the process of assigning a network identifier to each client node 12 operably connected to the network 10. The network identifier facilitates communication among the network nodes 12, 14. Similar to the client node 12, the output address pin 22 of the server node 14 is capable of having an active or inactive state. Normally, the client node's output address pin 22 is in the inactive state, however, the server node 14 can set the state to active. The state of the input 20 and output 22 address pin is responsive to the client node's processor 24 and to the output address pin 22 of the server node 14. Generally, the output address pin 22 of each client node 12 is in the inactive state. The output address pin 22 can be set active by a server node command, or when the server node 14 sets its own output address pin active. Thus, the server node 14 is aware of the state of each network node's 12 output address pin 22.

Each client node 12 utilized in the network 10 is selected in response to the functionality desired. The client node 12 can sense whether its input address pin 20 is inactive or being forced active. The client node 12 is capable of setting its output address pin 22 to active or allowing the status of the output address to fall inactive. The current address identifier of the client node 12 is stored in the node's memory 30. The memory 30 keeps a record of the amount of active/inactive transitions of the input address pin 20. At system power-up, the client nodes 12 are initialized with a default network identifier. The default network identifier is a temporary network identifier of the client node 12 and retained until a more permanent identifier, i.e., network address, can be assigned to the client node.

The server 14 may begin the assignment process upon receiving an address request from a client node 12. The server 14 can also initiate the assignment process upon a network power-up or a hot-swap of a client node 12. The address request transmitted by the client node 12 notifies any server node 14 on the network 10 that a client node has joined the network. At this time, the client node 12 is unconfigured for communication on the network 10. Essentially, after requesting the address identifier, the client node 12 is a passive participant merely responding to the messages of its server node 14 during the process of assigning the network address.

Besides assigning an address identifier to a client node 12 residing on the network 10, the server node 14 is capable of transmitting various messages to the client node. For instance, the server node 14 can also change or toggle the status of a client node's 12 output address pin 22.

Each client node 12 is capable of broadcasting an address request throughout the network 10. In response to the address identifier request, the server node 14 will assign an exclusive address identifier to replace the default identifier of each client node 12. Each client node 12 includes a memory location 30 for storing the assigned network identifier and the amount of inactive-active transitions of its input address pin 20 as toggled by the server 14. When requested, the client node 12 can provide the amount of toggles, i.e., state transitions, to the server node 14.

Initially, the client node identifier is unconfigured at power-up and each output address pin 22 is inactive. Each client node 12 contains a default value in its network identifier memory location 30; preferably the default value is 127. During power-up, the server node 14 reassigns the address of every client node 12 operably connected to the network 10. The client node 12 transmits a network broadcast message requesting a network address identifier and identifying itself by its default value. The server node 14 transmits a toggle signal having a predetermined amount of active-inactive transitions. The toggle signal is sent to any client node 12 having a default identifier. The nearest client node 12 receiving the toggle message will transition its output address status between active and inactive the amount of times sent by the server 14. The client node 12 will also store the amount of toggles in its memory 30. The server 14 then transmits a signal to obtain the amount of state transitions of the client node 12 having a default address. If the server 14 receives an amount of state transitions from the client node 12 matching the amount of state transitions transmitted, by the server node, the server will reassign the client node's address identifier from default.

Since all client nodes 12 have a default address upon power-up, the nearest client node to the server 14, e.g., the adjacent client node, will respond to the server's transition request signal. This client node 12 will then be reassigned a network address identifier. The output address pin 22 of the newly identified client node 12 will be set inactive. The server 14 will then receive another address request signal from another client node 12 that has yet to be assigned a replacement address identifier for its default identifier. The server node 14 will transmit another toggle signal to the default address and these steps will be repeated until all client nodes 12 having a default address have been reassigned a more permanent address identifier. An example of an algorithm utilized by the server node 14 during power-up of the network 10 is shown in FIG. 2.

Another aspect of the present invention involves assigning a network address identifier to a client node 12 actively inserted into a powered-up network 10, i.e., "hot swap." In this situation, the network has been powered up and the power-up client node assignments have been completed. One or more additional client nodes are inserted into the network. The newly added client nodes 12 will power-up upon insertion into the network 10 and broadcast an address request to the network. Because the address identifier of the added client nodes 12 is unconfigured, the default address identifier will be used in the request message transmitted by the newly added client node. FIG. 3 depicts an algorithm utilized during assignment of network identifiers to client nodes 12 in a "hot-swap" configuration.

Yet another aspect of the present invention is directed to optimizing the assignment of an address identifier for inserted, swapped, or substituted, client nodes 12, i.e., "hot swap." FIG. 4. The optimization process monitors the history of the network communication and utilizes the information to identify a client node 12 most likely requesting an address identifier. The server node 14 assumes that the client node 12 least recently communicated with is an optimal candidate to have been replaced with an operable device module 12, and thus more likely to be requesting an address identifier. Although the optimization process is similar to the non-optimized procedure, the optimization process assumes that the client node 12 that was least recently communicated with is the most probable candidate to be requesting an address identifier.

Steps 1–4 and 9.4.2.1 of the "hot swap" algorithm shown in FIG. 3 are used to detect which client node is missing. Utilizing an activity table, $ACT, the server node 14 begins by checking the most probable client nodes 12 requiring an address identifier, rather than systematically stepping through each client node in sequence, with respect to physical positioning on the network 10. FIG. 4.

The activity table is an array indexed by client node addresses. Each entry in the activity table includes several variables, i.e., $OLDER, $NEWER, $OLDEST, and $NEWEST. $OLDER is the node identifier, $NODEID, of the client node 12 that was communicated with immediately previous to the present client node. The client node 12 is unconfigured when it is the "oldest" in the activity table. NEWER is the node identifier of the client node 12 that is communicated with immediately following. This client node 12 is unconfigured immediately after a new message is received from this client node and the activity table is updated. $NEWEST and $OLDEST are two variables used to contain the node identifiers of the client nodes 12 that are most recently and least recently communicated with. For example, an array and structure notation is used to refer to activity table entries, e.g., $ACT[5]. $OLDER contains the identifier of the client node 12 that communicated with the server node 14 immediately prior to client node 5.

The activity table is initialized as follows: the $OLDER fields for client nodes 1 through $MAXNODES-1 are set to the client node identifier plus 1; the $OLDER field of the $MAXNODES client node is set to $UNCONFIGURED; the $NEWER field of the first client node is set to $UNCONFIGURED; and, the $OLDEST fields of client nodes 2-$MAXNODES are set to the client node identifier minus 1.

When a message is exchanged with a client node 12 on the network, the server node 14 updates the activity table to reflect that the client node now has been involved in the most recent communication. Each time the server node 14 sends or receives a message, it updates the activity table. An example of an algorithm for updating the activity table is shown in FIG. 5.

Yet another further aspect of the present invention is directed to reserving a location(s), e.g., client node placeholder address, within the network 10 for later population of device modules 12. This functionality is extremely useful for designing expandable networks that can be later upgraded. This ability provides a network designer the flexibility to configure the network 10 even though some of the equipment modules 12, 14 are not ready to be installed. Additionally, this ability can be utilized to compensates for a node failure wherein the node must be removed and a placeholder node can be inserted to reserve the address location until repair or replacement of the network module can be made. The placeholder comprises an input address pin and an output address pin. Both address pins are operably connected to the address bus 18 wherein the placeholder node inexpensively functions to reserve a location on the network 10 for later insertion of a module node 12.

The placeholder node includes two primary characteristics. First, the placeholder strips one transition cycle, i.e., inactive/active/inactive, off the toggle signal and must permit the remaining transitions of the toggle signal to pass through, i.e., from the placeholder node's input address pin to its output address pin. And second, the state of is the placeholder node's input address pin is copied through the placeholder node to its output address pin wherein after a series of transitions, the state of the output address pin can be held active for a predetermined amount of time.

Assuming an unaddressed client node 12 is adjacent the placeholder node, the unaddressed client node will receive and store, a value of one less transition of the toggle signal transmitted by the server node. The default addressed client node will respond to the server's request for toggle transitions and will then be assigned an address identifier with a value equal to 1 less than the address identifier assigned to the placeholder node located one physical position closer to the server node 14.

Placeholder nodes may be positioned adjacent to each other. Each placeholder node will then remove one inactive/active/inactive transition of the toggle message, thus leaving an available network address for each held location.

When a client node 12 is inserted to replace a placeholder node, the client node will be assigned an address identifier through the "hot swap," preferably optimized, method described above.

While the specific embodiment has been illustrated and described, numerous modifications come to mind without significantly departing from the spirit of the invention, and the scope of protection is only limited by the scope of the accompanying claims.

We claim:

1. A method of assigning a network identifier to a client node, the client node having a memory and being operably connected to a server wherein the server assigns the network identifier to the client node, the method comprising the steps of:

providing a default identifier, the default identifier being assigned to the client node;

broadcasting a request for assignment of a network identifier from the server, the request being broadcast by the client node;

determining a location of the client node, the location being identified with respect to the server; the determining a location of the client node including:

receiving a request for the network identifier from the client node, transmitting a toggle signal from the server, the toggle signal having an amount of state transitions, storing the amount of state transitions in the memory of the client node, identifying the client node having the default identifier and the amount of state transitions by transmitting a request by the server to receive the amount of state transitions stored in the memory of the client node and, comparing the amount of state transitions stored in the memory of the client node with the toggle signal wherein the network identifier is transmitted to the client node in response to the comparison; and, assigning the network identifier to the client node by the server to the client node in response to the determined location of the client node.

2. A method of assigning a network identifier to each of a plurality of client nodes operably connected to a network, each client node being operably connected to a network server wherein the network server assigns a network identifier to each client node, the method comprising the steps of:

providing a default network identifier, each of the plurality of client nodes being assigned the default network identifier;

requesting a network identifier from the network server, the request being made by the client node having the default identifier;

transmitting a toggle signal having a number of state transmissions by the network server;

storing the number of state transitions by the client node having the default identifier in a memory of the client node;

determining by the network server the client node having the default identifier and being nearest to the network server based on the stored state transitions in the client node by transmitting a request by the server to receive the amount of state transitions stored in the memory of the client node and, comparing the amount of state transitions stored in the memory of the client node with the toggle signal wherein the network identifier is transmitted to the client node in response to the comparison; and, assigning the network identifier by the network server to the identified client node, wherein additional, unique, network identifiers are subsequently assigned by the network server to each remaining client node having a default identifier and being nearest to the server.

3. The method of claim 2 further comprising:

inserting an additional client node into the network; and, identifying the additional client node for assigning the permanent network identifier.

4. The method of claim 3 further comprising:

optimizing the assigning of a network identifier, the optimizing comprising the steps of:

monitoring a level of network interaction of each client node;

selecting a client node having a lowest level of network interaction; and, assigning the network identifier in response to the selected client node.

5. A computer-readable storage medium readable by a programmable device, the programmable device being operably connected to a network wherein the medium assigns a network identifier to a client node, the client node having a memory and being operably connected to the programmable device, the medium comprising:

a first segment for determining a location of the client node by the programmable device in response to a request for a network identifier from the client node, the location being identified with respect to the programmable device;

a second segment for assigning the network identifier by the programmable device to the client node in response to the determined location of the client node a third segment for receiving a request for the network identifier;

a fourth segment for transmitting a toggle signal, the toggle signal having an amount of state transitions;

a fifth segment for storing the amount of state transitions in the memory of the client node; and, a sixth segment for identifying the client node having the default identifier and the amount of state transitions including a request segment for transmitting a request to receive the amount of state transitions stored in the memory of the client node and, a comparison segment for comparing the amount of state transitions stored in the memory of the client node with the toggle signal wherein the network identifier is transmitted to the client node in response to the comparison.

6. A network comprising a server node and a plurality of operably connected client nodes wherein a permanent identifier is assigned to each client node of the plurality of client nodes in response to a location of each client node with respect to the server node, the network comprising:

the server node having an address input and an address output;

each of the plurality of operably connected client nodes having an address input and an address output, the address input and the address output being operably connected to a microprocessor in the network client node;

a communication bus being operably connected to the server node and each of the one or more client nodes;

an address bus being operably connected the server node and each of the plurality of client nodes, the address bus being connected between the output address of the server node and the input address of the nearest client node, the output address of the nearest client node being connected to the input address of the next nearest client node, wherein each subsequent operably attached client node is similarly connected to the network; and, a network identifier being assigned to each client node of the plurality of client nodes by the server node, the network identifier of each client node being assigned a unique value in response to the location of each respective client node to the server node, the location of each client node being determined in part by a toggle signal having a number of state transitions transmitted by the server node wherein the server is configured to receive the amount of state transitions stored in the memory of the client node in response to a request transmitted by the server, compare the amount of state transitions stored in the memory of the client node with the toggle signal and transmit the network identifier to the client node in response to the comparison.

7. The communication network of claim 6 wherein at least one of the client nodes is a placeholder node for reserving a network identifier for the position occupied by the placeholder node.

8. The communication network of claim 6 wherein the communication bus is CANOpen.

9. The communication network of claim 6 wherein the client node is an output module.

10. A method for assigning a network identifier to a plurality of client nodes in a network communication system comprising the steps of:

providing a network adapter having an address output serially connected to a plurality of client nodes, each client node having an address input and an address output, wherein the address output of the network adapter is connected to the address input of a nearest adjacent client node of the plurality of client nodes and the address output of the nearest adjacent client node is connected to the address input of the next nearest adjacent client node of the plurality of client nodes;

initializing each of the plurality of client nodes with a default identifier;

transmitting a toggle signal having a predetermined number of active-inactive transitions by the network adapter;

storing the number of active-inactive transitions by a client node of the plurality of client nodes having a default identifier in a memory of the client node;

transmitting a signal to obtain the number of active-inactive transitions from the client node;

comparing the amount of active-inactive transitions from the client node with the toggle signal wherein the network identifier is transmitted to the client node in response to the comparison; and, assigning each of the plurality of client nodes a unique network identifier by the network adapter.

11. The method of claim 10 wherein the step of assigning each of the plurality of client nodes a unique network identifier by the network adapter occurs during power-up of the communication network system.

12. The method of claim 10 wherein the step of assigning each of the plurality of client nodes a unique network identifier by the network adapter occurs during a hot-swap of one of the plurality of client nodes of the communication network system.

13. The method of claim 10 wherein the step of assigning each of the plurality of client nodes a unique network identifier by the network adapter is initiated by the network adapter.

14. The method of claim 10 further comprises the steps of:
broadcasting a request for a network identifier by one of the plurality of client nodes.

15. The method of claim 10 further comprising the steps of:
receiving the toggle signal by the nearest one of the client nodes to the network adapter having a default address on its address input;

determining a location of the nearest one of the client nodes of the plurality of client nodes; and,
assigning the unique network identifier to the nearest one of the client nodes by the network adapter based on the location of the client node.

16. The method of claim 10 wherein the network adapter is a server node.

17. The method of claim 10 wherein the network adapter is a field bus connector.

* * * * *